United States Patent
Peterson et al.

(10) Patent No.: US 6,446,508 B1
(45) Date of Patent: Sep. 10, 2002

(54) VIBRATION COMPARTMENT ENVIRONMENTAL CONTROL

(75) Inventors: Clinton A. Peterson; Christopher J. Essenburg, both of Holland, MI (US)

(73) Assignee: Venturedyne, Ltd., Milwaukee, WI (US)

(*) Notice: Subject to any disclaimer, the term of this patent is extended or adjusted under 35 U.S.C. 154(b) by 10 days.

(21) Appl. No.: 09/761,987

(22) Filed: Jan. 17, 2001

(51) Int. Cl.[7] .................. G01M 7/02; G01N 17/00
(52) U.S. Cl. ...................... 73/571; 73/663; 73/865.6
(58) Field of Search .................. 73/571, 662, 663, 73/664, 665, 666, 667, 668, 865.6

(56) References Cited

U.S. PATENT DOCUMENTS

| | | | |
|---|---|---|---|
| 3,049,913 A | | 8/1962 | Hunt ........................ 73/571 |
| 3,241,358 A | * | 3/1966 | Booth et al. ............... 73/571 |
| 3,664,181 A | * | 5/1972 | Conrad et al. ............. 73/571 |
| 5,138,884 A | * | 8/1992 | Bonavia .................... 73/662 |
| 5,511,434 A | * | 4/1996 | Baker et al. ............. 73/865.6 |
| 5,540,109 A | | 7/1996 | Hobbs .................... 73/865.6 |
| 5,610,344 A | * | 3/1997 | Ueda et al. ................ 374/57 |
| 5,675,098 A | | 10/1997 | Hobbs .................... 73/865.6 |
| 5,804,732 A | | 9/1998 | Wetzel et al. ............... 73/663 |
| 5,969,256 A | | 10/1999 | Hobbs ....................... 73/663 |
| 5,979,242 A | | 11/1999 | Hobbs ....................... 73/663 |
| 6,105,433 A | * | 8/2000 | Hess .......................... 73/663 |
| 6,112,596 A | * | 9/2000 | Hess .......................... 73/663 |

* cited by examiner

*Primary Examiner*—Hezron Williams
*Assistant Examiner*—Rose M. Miller
(74) *Attorney, Agent, or Firm*—Jansson, Shupe & Munger, Ltd.

(57) ABSTRACT

A testing apparatus is provided for testing a product in various climatic conditions. The testing apparatus includes a testing cabinet defining a first testing chamber for receiving the product therein and a vibration chamber. A vibration table is positioned within the testing apparatus and has an upper surface communicating with the testing chamber and a lower surface. A plurality of vibrators are operatively connected to the lower surface of the vibration table and are disposed in the vibration chamber. A climate control structure communicates with the vibration chamber for controlling the environment thereof.

20 Claims, 1 Drawing Sheet

VIBRATION COMPARTMENT ENVIRONMENTAL CONTROL

FIELD OF THE INVENTION

This invention relates generally to testing equipment, and in particular, to an environmental testing apparatus incorporating a vibration table wherein the climate within the compartment which houses the vibrators for the vibration table is controlled.

BACKGROUND AND SUMMARY OF THE INVENTION

Many types of devices undergo testing to improve the quality and reliability of the devices. Typically, these types of devices undergo a series of environmental tests under various combinations of temperature, humidity, and other climatic conditions to insure product reliability and performance in extreme environmental conditions. Further, many of these devices undergo repetitive, shock vibration testing to insure that the devices are not adversely effected during normal operation.

In order to test their devices, manufacturers often utilize an environmental testing apparatus which is capable of producing rapid and extreme changes in temperature, humidity and other climatic conditions. A prominent designer and manufacturer of such environmental test apparatus is Thermotron Industries, Inc. of Holland, Mich. In operation, the devices to be tested are positioned within an environmental testing chamber in the testing apparatus wherein the devices are exposed to extreme climatic conditions.

Vibration testing is carried out by mounting the product to be tested upon some sort of platform or table which communicates with the environmental testing chamber and by then vibrating the table using any type of vibrator. Examples of a vibration table and the vibrators for vibrating the vibration table are shown in Wetzel et al., U.S. Pat. No. 5,804,732, assigned to the assignee of the present invention and incorporated herein by reference. Typically, in an environmental testing apparatus, the vibrators of the vibration table are positioned in a vibration compartment which is physically isolated from the environmental testing chamber. However, the vibrators in the vibration compartment are still partially exposed to the temperature extremes provided in the environmental testing chamber. As such, it is possible that the vibration means may be adversely effected, thereby reducing the efficiency of the vibration table. Further, exposing the vibrators to temperature extremes will lead to the expansion and contraction of the components of the vibrators during operation. This expansion and contraction of the components of the vibrators reduces the useful life of the vibrators and may cause leaks at the connections of the vibrators to a pneumatic source.

In order to minimize the effects of the temperature extremes within the vibration compartment, vents are often provided within the walls of the vibration compartment such that the interior of the vibration compartment communicates with the ambient air outside the environmental testing apparatus. By providing vents in the walls defining the vibration compartment, the noise external of the environmental testing apparatus is increased. Further, the vents in the walls allow particulate matter and moisture to enter the vibration compartment. Moisture within the vibration compartment has a tendency to penetrate and to freeze in the vibrators, thereby causing a decrease in the efficiency thereof. Heretofore, in order to prevent the moisture from freezing in the vibrators, dry-air or gaseous nitrogen was passed through the vibrators. This process of passing dry-air or gaseous nitrogen through the vibrators adds to the cost of the environmental testing apparatus. Therefore, it is highly desirable to eliminate this process while still preventing moisture from freezing in the vibrators.

Therefore, it is a primary object and feature of the present invention to provide a testing apparatus wherein the temperature within the compartment housing of the vibrators thereof is controlled.

It is a further object and feature of the present invention to provide a testing apparatus which discourages an accumulation of moisture within the vibrators thereof.

It is a further object and feature of the present invention to provide a testing apparatus which is simple to operate and less expensive to manufacture than prior testing apparatus.

In accordance with the present invention, a testing apparatus is provided for testing a product. The testing apparatus includes a testing cabinet which defines a first testing chamber and a vibration chamber. A vibration table has an upper surface communicating with the testing chamber and a lower surface. A plurality of vibrators are operatively connected to the lower surface of the vibration table and are disposed in the vibrator chamber. A climate control structure is provided for controlling the environment in the vibration chamber. The climate control structure includes a heating element communicating with the vibration chamber for heating the vibration chamber to a predetermined level. In addition, the climate controlling structure includes a cooling element communicating with the vibration chamber for cooling the vibration chamber to a predetermined level. A temperature sensor is positioned within the vibration chamber for sensing the temperature therein. A controller is operatively connected to the temperature sensor and to the heating and cooling elements. The controller controls the heating and cooling of the vibration chamber in response to the temperature sensed by the temperature sensor. It is contemplated that the vibration chamber be free from communication with the ambient air outside the testing cabinet.

In accordance with a further aspect of the present invention, a testing apparatus is provided for testing a product. The testing apparatus includes a testing cabinet defining a first testing chamber and a second vibration chamber. A vibration table has an upper surface communicating with the testing chamber and a lower surface. A plurality of vibrators are operatively connected to the lower surface of the vibration table and are disposed in the vibration chamber. A vibration chamber heating and cooling system communicates with the vibration chamber for maintaining the temperature in the vibration chamber at a predetermined level. In addition, a testing chamber heating and cooling system communicates with the testing chamber for varying the temperature in the testing chamber to predetermined levels.

The vibration chamber heating and cooling system includes a heating element communicating with the vibration chamber for heating the vibration chamber to a predetermined level. In addition, the vibration chamber heating and cooling system includes a cooling element communicating with the vibration chamber for cooling the vibration chamber to a predetermined level.

The testing apparatus also includes a temperature sensor within the vibration chamber for sensing the temperature therein. A controller is operatively connected to the temperature sensor and to the vibration chamber heating and cooling system. The controller controls the vibration chamber heating and cooling system in response to the temperature sensed by the temperature sensor. The controller may also be operatively connected to the testing chamber heating and cooling system for controlling the same. It is contemplated that the vibration chamber be free from communication with ambient air outside the testing chamber.

In accordance with a still further aspect of the present invention, an improvement is provided in the testing apparatus for testing a product. The testing apparatus includes a testing cabinet defining a first testing chamber for receiving the product therein and a vibration chamber; a vibration table having an upper surface communicating with the testing chamber and a lower surface; and a plurality of vibrators operatively connected to the lower surface of the vibration table and being disposed in the vibration chamber. The improvement includes providing a climate control structure communicating with the vibration chamber for controlling the environment therein.

The climate control structure includes a heating element communicating with the vibration chamber for heating the vibration chamber to a predetermined level. In addition, the climate control structure includes a cooling element communicating with the vibration chamber for cooling the vibration chamber to a predetermined level. A temperature sensor is positioned within the vibration chamber for sensing the temperature therein. A controller is operatively connected to the temperature sensor and to the heating and cooling elements for controlling the heating and cooling of the vibration chamber in response to the temperature sensed by the temperature sensor.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
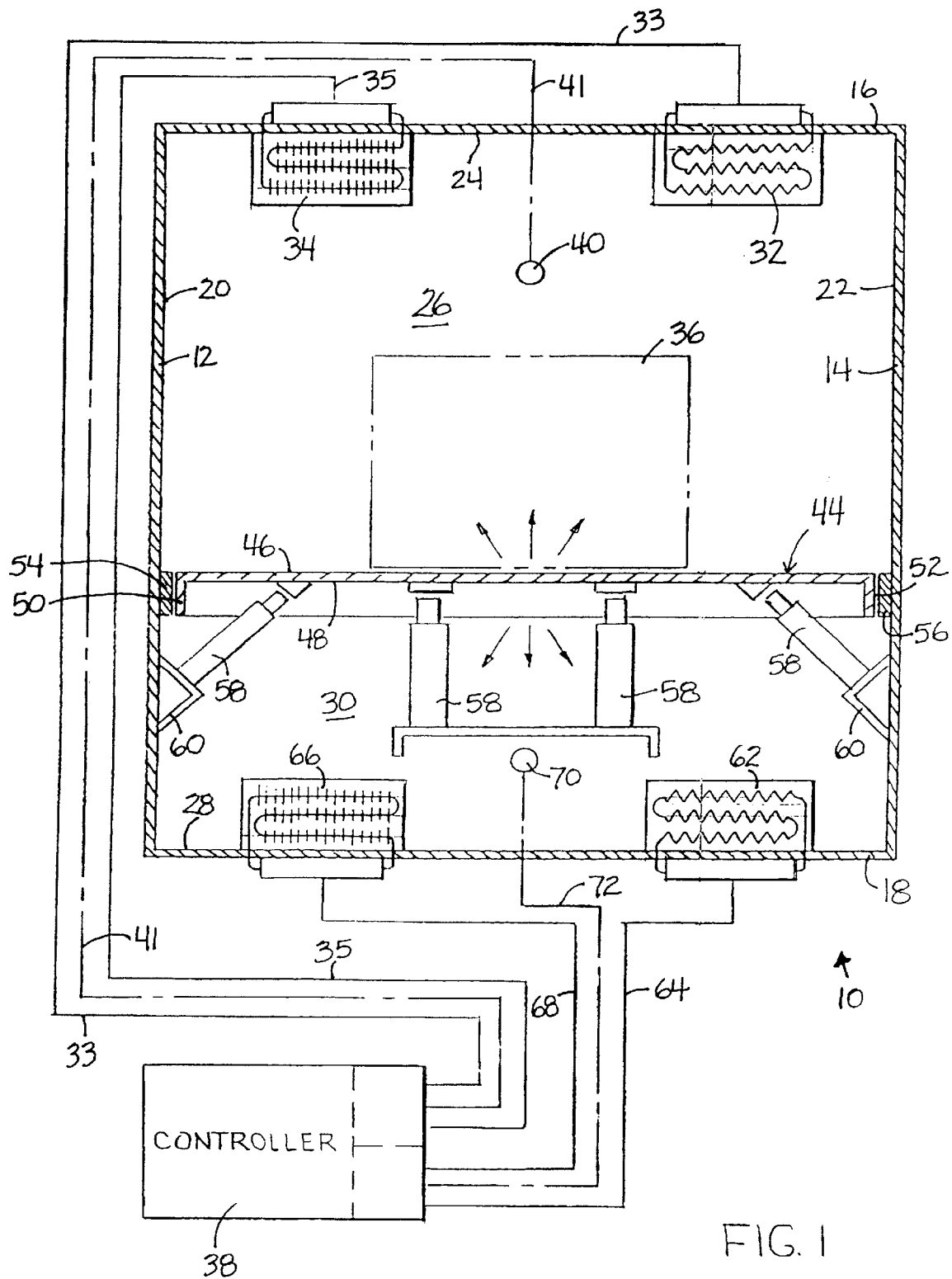
FIG. 1 is a schematic view of an environmental testing apparatus in accordance with the present invention.
Figure 1:
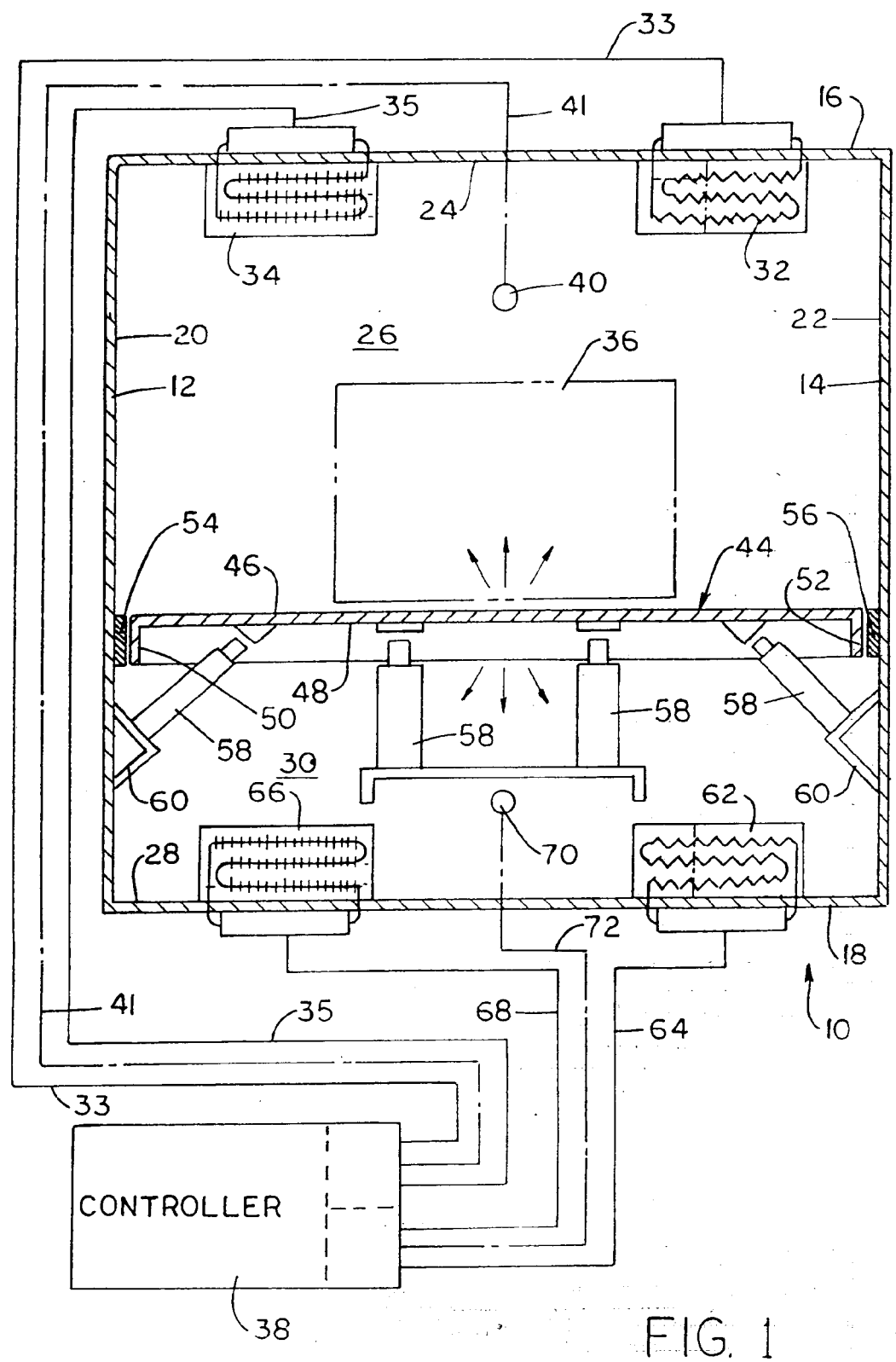

Referring to FIG. 1, a testing apparatus in accordance with the present invention is generally designated by the reference numeral 10. Testing apparatus 10 is defined by sidewalls 12 and 14, upper and lower walls 16 and 18, respectively, and a rear wall (not shown). Inner surfaces 20 and 22 of sidewalls 12 and 14, respectively, and inner surface 24 of upper wall 16 partially define an environmental testing chamber 26 within testing apparatus 10. Inner surfaces 20 and 22 of sidewalls 12 and 14, respectively, and inner surface 28 of bottom wall 18 partially define a vibration compartment 30 within testing apparatus 10. As is conventional, a door(s) (not shown) is provided for access to the interior of environmental testing chamber 26 and vibration compartment 30. It is noted, however, that sidewalls 12 and 14 and rear wall (not shown) are free of any openings such as vents, louvers or the like, so as to prevent communication between vibration compartment 30 and the ambient air outside testing apparatus 10, for reasons hereinafter described.

Heating element 32 is mounted to the inner surface 24 of upper wall 16 so as to be in communication with the interior of environmental testing chamber 26. In addition, heating element 32 is operatively connected to controller 38 through line 33. Cooling element 34 is also mounted to the inner surface 24 of upper wall 16 so as to be in communication with environmental testing chamber 26. Cooling element 34 is operatively connected to controller 38 through line 35. As is conventional, heating element 32 is provided to heat environmental testing chamber 26 to a user desired level to test the reliability and performance of a product 36 positioned within environmental testing chamber 26. Cooling element 34 is provided to cool environmental testing chamber 26 to a user desired temperature in order to test the reliability and performance of product 36. Temperature sensor 40 is positioned within environmental testing chamber 26 and is operatively connected to controller 38 by line 41 so as to allow controller 38 to monitor the temperature within environmental testing chamber 26. Controller 38 controls activation of heating element 32 and cooling element 34 in response to the temperature sensed within environmental testing chamber 26 by temperature sensor 40 so as to vary the climatic conditions provided within environmental testing chamber 26 to user desired levels.

Testing apparatus 10 further includes a vibration table 44 having an upper surface 46 communicating with environmental testing chamber 26 and a lower surface 48 directed towards vibration compartment 30. A flange 50 depends from the outer periphery of vibration table 44. Flange 50 includes an outer surface 52 directed towards the inner surfaces 20 and 22 of sidewalls 12 and 14, respectively. Seals 54 and 56 are affixed to corresponding surface 20 and 22, respectively, of sidewalls 12 and 14, respectively, so as to be aligned with outer surface 52 of flange 50. Seals 54 and 56 are provided to environmentally isolate vibration chamber 30 from environmental testing chamber 26 within testing apparatus 10.

A plurality of vibrators 58 extend between lower surface 48 of vibration table 44 and corresponding supports 60 within the interior of vibration compartment 30. It can be appreciated that vibrators 58 may be mounted to the lower surface 48 of vibration table 44 in any suitable manner, at any of several locations, and at any of one or more angles to lower surface 48 thereof. As is conventional, vibrators 58 are provided to vibrate vibration table 44, and hence product 36, during testing. Vibrators 58 may take the form of the vibrator fully described in Briggs et al., U.S. Pat. No. 6,044,709, assigned to the assignee of the present invention and incorporated herein by reference. It can be appreciated that other constructions of vibrators 58 may be utilized without deviating from the scope of the present invention.

Heating element 62 is interconnected to the inner surface 28 of bottom wall 18 and is in communication with vibration compartment 30. Heating element 62 is operatively connected to controller 38 through line 64. In addition, cooling element 66 is interconnected to inner surface 28 of bottom wall 18 of testing apparatus 10 and is in communication with vibration compartment 30. Cooling element 66 is operatively connected to controller 38 by line 68. Temperature sensor 70 is positioned within vibration compartment 30 in testing apparatus 10 and is operatively connected to controller 38 by line 72.

In operation, product 36 is rigidly connected to upper surface 46 of vibration table 44. Vibrators 58 vibrate vibration table 44 in a conventional manner. Heating element 32 and cooling element 34 raise and lower the temperature in environmental testing chamber 26 in order to test product 36 under various climate conditions. Temperature sensor 40 allows controller 38 to monitor the temperature within environmental testing chamber 26 such that controller 38 selectively activates heating element 32 and/or cooling element 34 to provide a user desired temperature within environmental testing chamber 26.

In addition, temperature sensor 70 allows controller 38 to monitor the temperature within vibration compartment 30. Controller 38 selectively activates heating element 62 and/or cooling element 66 in response to the temperature sensed by temperature sensor 70 so as to maintain the temperature within vibration compartment 30 at a generally constant level to insure maximum performance and useful life of vibrators 58.

As described, vibration compartment 30 is isolated from the ambient air outside testing apparatus 10. As such, the noise generated by testing apparatus 10 is reduced since a substantial portion of such noise is captured within the testing apparatus 10. Further, since vibration compartment 30 does not communicate with the outside ambient air, particulate matter and moisture is prevented from entering vibration compartment 30.

It can be appreciated that the positions of heating element 32 and cooling element 34 may be varied. However, heating element 32 and cooling element 34 must communicate with the interior of environmental testing chamber 26. Similarly, the positions of heating element 62 and cooling element 66 may be varied. However, heating element 62 and cooling element 66 must be in communication with the interior of vibration compartment 30.

Further, as described, controller 38 is represented as a single unit. However, it can be appreciated that multiple controllers may be utilized without deviating from the scope of the present invention.

Various modes of carrying out the invention are contemplated as being within the scope of the following claims particularly pointing out and distinctly claiming the subject matter which is regarded as the invention.

We claim:

1. A testing apparatus for testing a product, comprising:
   a testing cabinet defining a first testing chamber and a vibration chamber;
   a vibration table having a upper surface communicating with the testing chamber and a lower surface;
   a plurality of vibrators operatively connected to the lower surface of the vibration table and being disposed in the vibration chamber; and
   a climate control structure for controlling the environment in the vibration chamber.

2. The testing apparatus of claim 1 wherein the climate control structure includes a heating element communicating with the vibration chamber for heating the vibration chamber to a predetermined level.

3. The testing apparatus of claim 1 wherein the climate control structure includes a cooling element communicating with the vibration chamber for cooling the vibration chamber to a predetermined level.

4. The testing apparatus of claim 1 wherein the climate control structure includes a heating and cooling system communicating with the vibration chamber, the heating and cooling system maintaining the temperature in the vibration chamber at a predetermined level.

5. The testing apparatus of claim 4 wherein the climate control structure further includes a temperature sensor within the vibration chamber for sensing the temperature therein.

6. The testing apparatus of claim 5 wherein the climate control structure includes a controller operatively connected to the temperature sensor and to the heating and cooling system, the controller controlling the heating and cooling system in response to the temperature sensed by the temperature sensor.

7. The testing apparatus of claim 1 wherein the vibration chamber is free from communication with ambient air outside the testing cabinet.

8. The testing chamber of claim 1 wherein the climate control structure controls the environment within the testing chamber and wherein the climate control structure includes a first heating and cooling system communicating with the vibration chamber for maintaining the temperature in the vibration chamber at a predetermined level and a second heating and cooling system communicating with the testing chamber for varying the temperature in the testing chamber to a predetermined level.

9. A testing apparatus for testing a product, comprising:
   a testing cabinet defining a first testing chamber and a vibration chamber;
   a vibration table having an upper surface communicating with the testing chamber and a lower surface;
   a plurality of vibrators operatively connected to the lower surface of the vibration table and being disposed in the vibration chamber;
   a vibration chamber heating and cooling system communicating with the vibration chamber for maintaining the temperature in the vibration chamber at a predetermined level; and
   a testing chamber heating and cooling system communicating with the testing chamber for varying the temperature in the testing chamber to a predetermined level.

10. The testing apparatus of claim 9 wherein the vibration chamber heating and cooling system includes a heating element communicating with the vibration chamber for heating the vibration chamber to a predetermined level.

11. The testing apparatus of claim 9 wherein the vibration chamber heating and cooling system includes a cooling element communicating with the vibration chamber for cooling the vibration chamber to a predetermined level.

12. The testing apparatus of claim 9 further comprising:
    a temperature sensor within the vibration chamber for sensing the temperature therein; and
    a controller operatively connected to the temperature sensor and to the vibration chamber heating and cooling system, the controller controlling the vibration chamber heating and cooling system in response to the temperature sensed by the temperature sensor.

13. The testing apparatus of claim 12 wherein the controller is operatively connected to the testing chamber heating and cooling system for controlling the same.

14. The testing apparatus of claim 9 wherein the vibration chamber is free from communication with ambient air outside the testing cabinet.

15. An improvement in a testing apparatus for testing a product, the testing apparatus including a testing cabinet defining a first testing chamber for receiving the product therein and a vibration chamber; a vibration table having a upper surface communicating with the testing chamber and a lower surface; and a plurality of vibrators operatively connected to the lower surface of the vibration table and being disposed in the vibration chamber, the improvement comprising:
    a climate control structure communicating with the vibration chamber for controlling the environment therein.

16. The improvement of claim 15 wherein the climate control structure includes a heating element communicating with the vibration chamber for heating the vibration chamber to a predetermined level.

17. The improvement of claim 15 wherein the climate control structure includes a cooling element communicating with the vibration chamber for cooling the vibration chamber to a predetermined level.

18. The improvement of claim 15 wherein the climate control structure includes a heating and cooling system communicating with the vibration chamber, the heating and cooling system maintaining the temperature in the vibration chamber at a predetermined level.

19. The improvement of claim 18 wherein the climate control structure further includes a temperature sensor within the vibration chamber for sensing the temperature therein.

20. The improvement of claim 19 wherein the climate control structure includes a controller operatively connected to the temperature sensor and to the heating and cooling system, the controller controlling the heating and cooling system in response to the temperature sensed by the temperature sensor.

* * * * *

UNITED STATES PATENT AND TRADEMARK OFFICE
CERTIFICATE OF CORRECTION

PATENT NO. : 6,446,508 B1
DATED : September 10, 2002
INVENTOR(S) : Peterson et al.

It is certified that error appears in the above-identified patent and that said Letters Patent is hereby corrected as shown below:

Delete the title page and columns 1-8 and substitute therefor, the attached title page and columns 1-8.

Drawings,
Delete the drawing in the patent and substitute the attached drawing.

Signed and Sealed this

Tenth Day of August, 2004

JON W. DUDAS
*Acting Director of the United States Patent and Trademark Office*

(12) United States Patent
Peterson et al.

(10) Patent No.: US 6,446,508 B1
(45) Date of Patent: Sep. 10, 2002

(54) TESTING APPARATUS WITH ENVIRONMENTALLY-CONTROLLED VIBRATOR COMPARTMENT

(75) Inventors: Clinton A. Peterson, Holland, MI (US); Christopher J. Essenburg, Holland, MI (US)

(73) Assignee: Venturedyne, Ltd., Milwaukee, WI (US)

(*) Notice: Subject to any disclaimer, the term of this patent is extended or adjusted under 35 U.S.C. 154(b) by 0 days.

(21) Appl. No.: 09/761,987

(22) Filed: Jan. 17, 2001

(65) Prior Publication Data

US 2002/0092354 A1 Jul. 18, 2002

(51) Int. Cl.$^7$ .................... G01M 7/02; G01N 17/00
(52) U.S. Cl. .................... 73/571; 73/663; 73/865.6
(58) Field of Search .................... 73/571, 662, 663, 73/664, 665, 666, 667, 668, 865.6

(56) References Cited

U.S. PATENT DOCUMENTS

| | | | | |
|---|---|---|---|---|
| 3,049,913 A | | 8/1962 | Hunt | 73/571 |
| 3,241,358 A | * | 3/1966 | Booth et al. | 73/571 |
| 3,664,181 A | * | 5/1972 | Conrad et al. | 73/571 |
| 5,138,884 A | * | 8/1992 | Bonavia | 73/662 |
| 5,511,434 A | * | 4/1996 | Baker et al. | 73/865.6 |
| 5,540,109 A | | 7/1996 | Hobbs | 73/865.6 |
| 5,610,344 A | * | 3/1997 | Ueda et al. | 374/57 |
| 5,675,098 A | | 10/1997 | Hobbs | 73/865.6 |
| 5,804,732 A | | 9/1998 | Wetzel et al. | 73/663 |
| 5,969,256 A | | 10/1999 | Hobbs | 73/663 |
| 5,979,242 A | | 11/1999 | Hobbs | 73/663 |
| 6,105,433 A | * | 8/2000 | Hess | 73/663 |
| 6,112,596 A | * | 9/2000 | Hess | 73/663 |

* cited by examiner

Primary Examiner—Hezron Williams
Assistant Examiner—Rose M. Miller
(74) Attorney, Agent, or Firm—Jansson, Shupe & Munger, Ltd.

(57) ABSTRACT

A testing apparatus (10) is provided for testing a manufactured product (36) in various climatic conditions. The testing apparatus includes a testing cabinet defining a testing chamber (26) for receiving the product therein and a vibrator compartment (30). A vibration table (44) is positioned within the testing apparatus and has an upper surface (46) communicating with the testing chamber and a lower surface (48). A plurality of vibrators (58) are operatively connected to the lower surface of the vibration table and are disposed in the vibrator compartment. A climate control structure (62, 66, 70 and 38) communicates with the vibrator compartment for controlling the environment thereof.

20 Claims, 1 Drawing Sheet

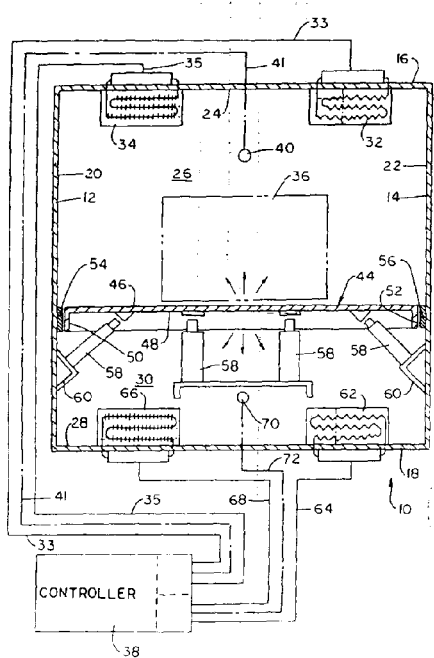

TESTING APPARATUS WITH ENVIRONMENTALLY-CONTROLLED VIBRATOR COMPARTMENT

FIELD OF THE INVENTION

This invention relates generally to testing equipment and, more specifically, to environmental testing apparatus of the type incorporating vibration devices.

BACKGROUND OF THE INVENTION

Many types of manufactured devices (products) undergo testing to determine or assure their quality and reliability. Typically, such products undergo a series of environmental tests under various combinations of temperature, humidity, and other climatic conditions to insure product reliability and performance in extreme environmental conditions. Further, many such devices undergo repetitive shock testing, i.e., vibration testing, to insure that they are not adversely effected during normal operation.

In order to test their manufactured products, manufacturers often utilize an environmental testing apparatus which is capable of producing rapid and extreme changes in temperature, humidity and other climatic conditions. A prominent designer and manufacturer of such environmental test apparatus is Thermotron Industries, Inc. of Holland, Mich. In operation, the devices to be tested are positioned inside an environmental testing chamber within the testing apparatus and in such testing chamber are exposed to extreme climatic conditions.

Vibration testing is carried out by mounting the manufactured device(s) to be tested on some sort of platform or table which communicates with the environmental testing chamber and then vibrating the table using any type of vibrator. Examples of vibration tables and the vibrators for such tables are shown in U.S. Pat. No. 5,804,732 (Wetzel et al.), assigned to the assignee of the present invention. The disclosure of such patent is incorporated herein by reference. Typically, in an environmental testing apparatus the vibrators of a vibration table are positioned in a vibrator compartment which is physically isolated from the environmental testing chamber. However, the vibrators in such a vibrator compartment are typically still partially exposed to the temperature extremes provided in the environmental testing chamber. Because of this, it is possible that the vibrators may be adversely effected, thereby reducing the efficiency of the vibration table. Furthermore, exposing the vibrators to temperature extremes will lead to expansion and contraction of vibrator components during operation. This expansion and contraction of components reduces useful life of the vibrators and may cause leaks at connections of the vibrators to a pneumatic source.

In order to minimize the effects of the temperature extremes within the vibrator compartment, vents are often provided within the walls of the vibrator compartment such that the interior of the vibrator compartment communicates with the ambient air outside the environmental testing apparatus. By providing vents in the walls defining the vibrator compartment, the noise created by the environmental testing apparatus is increased. Furthermore, the vents in the walls allow particulate matter and moisture to enter the vibrator compartment, and moisture in the vibrator compartment has a tendency to penetrate and to freeze in the vibrators, thereby decreasing their efficiency.

In order to prevent moisture from freezing in the vibrators of environmental testing apparatus of the prior art, dry-air or gaseous nitrogen was passed through the vibrators. This process of passing dry-air or gaseous nitrogen through the vibrators adds to the cost of operating the environmental testing apparatus. It would be highly desirable to eliminate this process while still preventing moisture from freezing in the vibrators.

OBJECTS OF THE INVENTION

A primary object of this invention is to provide an improved environmental testing apparatus of the type including vibrators which overcomes problems and shortcomings of the prior art, including those described above.

Another object of this invention is to provide an improved environmental and vibration testing apparatus in which the vibrators are exposed to controlled temperatures.

Another object of this invention is to provide an improved environmental testing apparatus of the type including vibrators in which the vibrators are in a compartment which has a controlled temperature therein.

Still another object of this invention to provide an environmental test apparatus with vibrators which discourages an accumulation of moisture within the vibrators.

Yet another object of this invention to provide environmental testing apparatus which is simple and efficient to operate, and which is less expensive to manufacture than certain prior testing apparatus.

These and other objects of the invention will be apparent from the descriptions of the invention and certain preferred embodiments.

SUMMARY OF THE INVENTION

In accordance with the present invention, a testing apparatus is provided for testing a manufactured device (product). The testing apparatus includes a testing cabinet which defines a testing chamber and a vibrator compartment. A vibration table has an upper surface communicating with the testing chamber and a lower surface. A plurality of vibrators are operatively connected to the lower surface of the vibration table and are disposed in the vibrator chamber. A climate control structure is provided for controlling the environment in the vibrator compartment.

The climate control structure includes a heating element communicating with the vibrator compartment for heating the vibrator compartment to a predetermined level. In addition, the climate-controlling structure includes a cooling element communicating with the vibrator compartment for cooling the vibrator compartment to a predetermined level. A temperature sensor is positioned within the vibrator compartment for sensing the temperature therein. A controller is operatively connected to the temperature sensor and to the heating and cooling elements. The controller controls the heating and cooling of the vibrator compartment in response to the temperature sensed by the temperature sensor. It is contemplated that the vibrator compartment be free from communication with the ambient air outside the testing cabinet.

In accordance with a further aspect of the present invention, a testing apparatus is provided for testing a product. The testing apparatus includes a testing cabinet defining a testing chamber and a vibrator compartment. A vibration table has an upper surface communicating with the testing chamber and a lower surface. A plurality of vibrators are operatively connected to the lower surface of the vibration table and are disposed in the vibrator compartment. A vibrator compartment heating and cooling system communicates with the vibrator compartment for maintaining the temperature in the vibrator compartment at a predetermined level. In addition, a testing chamber heating and cooling system communicates with the testing chamber for varying the temperature in the testing chamber to predetermined levels.

The vibrator compartment heating and cooling system includes a heating element communicating with the vibrator compartment for heating the vibrator compartment to a predetermined level. In addition, the vibrator compartment heating-and-cooling system includes a cooling element communicating with the vibrator compartment for cooling the vibrator compartment to a predetermined level.

The testing apparatus also includes a temperature sensor within the vibrator compartment for sensing the temperature therein. A controller is operatively connected to the temperature sensor and to the vibrator compartment heating-and-cooling system. The controller controls the vibrator compartment heating-and-cooling system in response to the temperature sensed by the temperature sensor. The controller may also be operatively connected to the testing chamber heating-and-cooling system for controlling the same. It is contemplated that the vibrator compartment be free from communication with ambient air outside the testing chamber.

In accordance with a still further aspect of the present invention, an improvement is provided in the testing apparatus for testing a product. The testing apparatus includes a testing cabinet defining a testing chamber for receiving the product therein and a vibrator compartment; a vibration table having an upper surface communicating with the testing chamber and a lower surface; and a plurality of vibrators operatively connected to the lower surface of the vibration table and being disposed in the vibrator compartment. The improvement includes providing a climate control structure communicating with the vibrator compartment for controlling the environment therein.

The climate control structure includes a heating element communicating with the vibrator compartment for heating the vibrator compartment to a predetermined level. In addition, the climate control structure includes a cooling element communicating with the vibrator compartment for cooling the vibrator compartment to a predetermined level. A temperature sensor is positioned within the vibrator compartment for sensing the temperature therein. A controller is operatively connected to the temperature sensor and to the heating and cooling elements for controlling the heating and cooling of the vibrator compartment in response to the temperature sensed by the temperature sensor.

BRIEF DESCRIPTION OF THE DRAWING

FIG. 1 is a schematic view of an environmental testing apparatus which is a preferred embodiment of the invention, having the features referred to above and providing the advantages set forth above.

DETAILED DESCRIPTION OF THE PREFERRED EMBODIMENT

Referring to FIG. 1, an environmental testing apparatus in accordance with the invention is generally designated by the reference numeral 10.

Testing apparatus 10 is defined by sidewalls 12 and 14, upper and lower walls 16 and 18 and a rear wall (not shown). Inner surfaces 20 and 22 of sidewalls 12 and 14, respectively, and inner surface 24 of upper wall 16 partially define an environmental testing chamber 26 within testing apparatus 10. Inner surfaces 20 and 22 of sidewalls 12 and 14, respectively, and inner surface 28 of bottom wall 18 partially define a vibrator compartment 30 within testing apparatus 10. As is conventional, a door or doors (not shown) is (are) provided for access to the interior of environmental testing chamber 26 and vibrator compartment 30. It is noted, however, that sidewalls 12 and 14 and the rear wall (not shown) are free of any openings such as vents, louvers or the like, in order to prevent communication between vibrator compartment 30 and the ambient air outside testing apparatus 10, for reasons hereinafter described.

Heating element 32 is mounted to inner surface 24 of upper wall 16 so as to be in communication with the interior of environmental testing chamber 26. In addition, heating element 32 is operatively connected to controller 38 through line 33. Cooling element 34 is also mounted to the inner surface 24 of upper wall 16 in order to be in communication with environmental testing chamber 26. Cooling element 34 is operatively connected to controller 38 through line 35. As is conventional, heating element 32 is provided to heat environmental testing chamber 26 to a user-desired level to test the reliability and performance of a manufactured device 36 positioned within environmental testing chamber 26. Cooling element 34 is provided to cool environmental testing chamber 26 to a user-desired temperature in order to test the reliability and performance of manufactured device 36. Temperature sensor 40 is positioned within environmental testing chamber 26 and is operatively connected to controller 38 by line 41 so as to allow controller 38 to monitor the temperature within environmental testing chamber 26. Controller 38 controls activation of heating element 32 and coolifig element 34 in response to the temperature sensed within environmental testing chamber 26 by temperature sensor 40 so as to vary the climatic conditions provided within environmental testing chamber 26 to user-desired levels.

Testing apparatus 10 further includes a vibration table 44 having an upper surface 46 communicating with (exposed to) environmental testing chamber 26 and a lower surface 48 directed toward vibrator compartment 30. A flange 50 depends from the outer periphery of vibration table 44. Flange 50 includes an outer surface 52 directed toward inner surfaces 20 and 22 of sidewalls 12 and 14, respectively. Seals 54 and 56 are affixed to corresponding surface 20 and 22, respectively, of sidewalls 12 and 14, respectively, so as to be aligned with outer surface 52 of flange 50. Seals 54 and 56 are provided to environmentally isolate vibrator compartment 30 from environmental testing chamber 26 within environmental testing apparatus 10.

A plurality of vibrators 58 extend between lower surface 48 of vibration table 44 and corresponding supports 60 within the interior of vibrator compartment 30. It can be appreciated that vibrators 58 may be mounted to the lower surface 48 of vibration table 44 in any suitable manner, at any of several locations, and at any of one or more angles to lower surface 48 thereof. As is conventional, vibrators 58 are provided to vibrate vibration table 44, and hence manufactured device 36, during testing. Vibrators 58 may take the form of the vibrator fully described in U.S. Pat. No. 6,044,709 (Briggs et al.), assigned to the assignee of the present invention and incorporated herein by reference. It can be appreciated that other constructions of vibrators may be utilized without deviating from the scope of the present invention.

Heating element 62 is connected to the inner surface 28 of bottom wall 18 and is in communication with vibrator compartment 30. Heating element 62 is operatively connected to controller 38 through line 64. In addition, cooling element 66 is connected to inner surface 28 of bottom wall 18 of testing apparatus 10 and is in communication with vibrator compartment 30. Cooling element 66 is operatively connected to controller 38 by line 68. Temperature sensor 70 is positioned within vibrator compartment 30 in testing apparatus 10 and is operatively connected to controller 38 by line 72.

In operation, manufactured device or product 36 is rigidly connected to upper surface 46 of vibration table 44. Vibrators 58 vibrate vibration table 44 in a conventional manner. Heating element 32 and cooling element 34 raise and lower the temperature in environmental testing chamber 26 in order to test manufactured device 36 under various climate conditions. Temperature sensor 40 allows controller 38 to monitor the temperature within environmental testing chamber 26 such that controller 38 selectively activates heating element 32 and/or cooling element 34 to provide a user-desired temperature within environmental testing chamber 26.

In addition, temperature sensor 70 allows controller 38 to monitor the temperature within vibrator compartment 30. Controller 38 selectively activates heating element 62 and/or cooling element 66 in response to the temperature sensed by temperature sensor 70 so as to maintain the temperature within vibrator compartment 30 at a generally constant level to insure maximum performance and useful life of vibrators 58.

As described, vibrator compartment 30 is isolated from the ambient air outside testing apparatus 10. As such, the noise generated by testing apparatus 10 is reduced since a substantial portion of such noise is captured within the testing apparatus 10. Further, since vibrator compartment 30 does not communicate with the outside ambient air, particulate matter and moisture is prevented from entering vibrator compartment 30.

It can be appreciated that the positions of heating element 32 and cooling element 34 may be varied. However, heating element 32 and cooling element 34 must communicate with the interior of environmental testing chamber 26. Similarly, the positions of heating element 62 and cooling element 66 may be varied. However, heating element 62 and cooling element 66 must be in communication with the interior of vibrator compartment 30.

Furthermore, while controller 38 is represented as a single unit, it can be appreciated that multiple controllers may be utilized without deviating from the scope of the present invention.

While this invention has been described in connection with preferred embodiments thereof, it is obvious that modifications and changes may be made by those skilled in the art to which it pertains without departing from the spirit and scope of the invention. Accordingly, the scope of this invention is to be limited only by the appended claims.

We claim:

1. A testing apparatus for testing a product, comprising:
   a testing cabinet defining a testing chamber and a vibrator compartment;
   a vibration table having a upper surface communicating with the testing chamber and a lower surface;
   a plurality of vibrators operatively connected to the lower surface of the vibration table and being disposed in the vibrator compartment; and
   a climate control structure for controlling the environment in the vibrator compartment.

2. The testing apparatus of claim 1 wherein the climate control structure includes a heating element communicating with the vibrator compartment for heating the vibrator compartment to a predetermined level.

3. The testing apparatus of claim 1 wherein the climate control structure includes a cooling element communicating with the vibrator compartment for cooling the vibrator compartment to a predetermined level.

4. The testing apparatus of claim 1 wherein the climate control structure includes a heating-and-cooling system communicating with the vibrator compartment, the heating-and-cooling system maintaining the temperature in the vibrator compartment at a predetermined level.

5. The testing apparatus of claim 4 wherein the climate control structure further includes a temperature sensor within the vibrator compartment for sensing the temperature therein.

6. The testing apparatus of claim 5 wherein the climate control structure includes a controller operatively connected to the temperature sensor and to the heating-and-cooling system, the controller controlling the heating-and-cooling system in response to the temperature sensed by the temperature sensor.

7. The testing apparatus of claim 1 wherein the vibrator compartment is free from communication with ambient air outside the testing cabinet.

8. The testing chamber of claim 1 wherein the climate control structure controls the environment within the testing chamber and wherein the climate control structure includes a first heating-and-cooling system communicating with the vibrator compartment for maintaining the temperature in the vibrator compartment at a predetermined level and a second heating-and-cooling system communicating with the testing chamber for varying the temperature in the testing chamber to a predetermined level.

9. A testing apparatus for testing a product, comprising:
   a testing cabinet defining a testing chamber and a vibrator compartment;
   a vibration table having an upper surface communicating with the testing chamber and a lower surface;
   a plurality of vibrators operatively connected to the lower surface of the vibration table and being disposed in the vibrator compartment;
   a vibrator compartment heating-and-cooling system communicating with the vibrator compartment for maintaining the temperature in the vibrator compartment at a predetermined level; and
   a testing chamber heating-and-cooling system communicating with the testing chamber for varying the temperature in the testing chamber to a predetermined level.

10. The testing apparatus of claim 9 wherein the vibrator compartment heating-and-cooling system includes a heating element communicating with the vibrator compartment for heating the vibrator compartment to a predetermined level.

11. The testing apparatus of claim 9 wherein the vibrator compartment heating-and-cooling system includes a cooling element communicating with the vibrator compartment for cooling the vibrator compartment to a predetermined level.

12. The testing apparatus of claim 9 further comprising:
   a temperature sensor within the vibrator compartment for sensing the temperature therein; and
   a controller operatively connected to the temperature sensor and to the vibrator compartment heating-and-cooling system, the controller controlling the vibrator compartment heating-and-cooling system in response to the temperature sensed by the temperature sensor.

13. The testing apparatus of claim 12 wherein the controller is operatively connected to the testing chamber heating-and-cooling system for controlling the same.

14. The testing apparatus of claim 9 wherein the vibrator compartment is free from communication with ambient air outside the testing cabinet.

15. An improvement in a testing apparatus for testing a product, the testing apparatus including a testing cabinet defining a testing chamber for receiving the product therein and a vibrator compartment; a vibration table having a upper surface communicating with the testing chamber and a lower surface; and a plurality of vibrators operatively connected to the lower surface of the vibration table and being disposed in the vibrator compartment, the improvement comprising a climate control structure communicating with the vibrator compartment for controlling the environment therein.

16. The improvement of claim 15 wherein the climate control structure includes a heating element communicating with the vibrator compartment for heating the vibrator compartment to a predetermined level.

17. The improvement of claim 15 wherein the climate control structure includes a cooling element communicating with the vibrator compartment for cooling the vibrator compartment to a predetermined level.

18. The improvement of claim 15 wherein the climate control structure includes a heating-and-cooling system communicating with the vibrator compartment, the heating-and-cooling system maintaining the temperature in the vibrator compartment at a predetermined level.

19. The improvement of claim 18 wherein the climate control structure further includes a temperature sensor within the vibrator compartment for sensing the temperature therein.

20. The improvement of claim 19 wherein the climate control structure includes a controller operatively connected to the temperature sensor and to the heating-and-cooling system, the controller controlling the heating-and-cooling system in response to the temperature sensed by the temperature sensor.

* * * * *